US007821900B2

(12) United States Patent
Rothenberg (10) Patent No.: US 7,821,900 B2
(45) Date of Patent: Oct. 26, 2010

(54) DIFFRACTIVE OPTICAL ELEMENT AND METHOD OF DESIGNING THE SAME

(75) Inventor: Joshua Elliott Rothenberg, Los Angeles, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 321 days.

(21) Appl. No.: 12/153,214

(22) Filed: May 15, 2008

(65) Prior Publication Data
US 2009/0285076 A1 Nov. 19, 2009

(51) Int. Cl.
*G11B 7/00* (2006.01)
(52) U.S. Cl. .................... 369/112.03; 369/112.23; 369/44.23
(58) Field of Classification Search .......... None
See application file for complete search history.

(56) References Cited

U.S. PATENT DOCUMENTS

| | | | |
|---|---|---|---|
| 4,545,646 A | 10/1985 | Chern et al. | |
| 6,400,509 B1 | 6/2002 | Sappey et al. | |
| 6,529,321 B2 | 3/2003 | Pan et al. | |
| 6,650,477 B2 | 11/2003 | Nakai | |
| 6,775,066 B2 | 8/2004 | Kurisu et al. | |
| 6,788,465 B2 | 9/2004 | Kleemann et al. | |
| 7,002,747 B2 | 2/2006 | Augustyn et al. | |
| 7,054,065 B2 | 5/2006 | Wolfe et al. | |
| 7,095,560 B2 | 8/2006 | Toyoda et al. | |
| 7,142,363 B2 | 11/2006 | Sato et al. | |
| 7,187,499 B2 | 3/2007 | Kleemann et al. | |
| 7,649,825 B2 * | 1/2010 | Tsuchida et al. ........ 369/112.07 |
| 7,704,684 B2 * | 4/2010 | Rogers et al. ............... 430/325 |
| 2004/0169929 A1 | 9/2004 | Sato et al. | |
| 2005/0078374 A1 | 4/2005 | Taira et al. | |
| 2005/0190811 A1 | 9/2005 | Gruhlke | |
| 2005/0226122 A1* | 10/2005 | Ooi et al. ............... 369/112.05 |
| 2007/0201795 A1 | 8/2007 | Rice et al. | |
| 2007/0223326 A1* | 9/2007 | Yamamoto et al. ....... 369/44.28 |
| 2007/0229939 A1 | 10/2007 | Brown et al. | |

OTHER PUBLICATIONS

Press, William et al, "Minimization or Maximization of Functions." in: *Numerical Recipes in C: The Art of Scientific Computing, Second Edition* (New York, Cambridge University Press, 1992), Chapter 10, pp. 394-455.

(Continued)

*Primary Examiner*—Muhammad N. Edun
(74) *Attorney, Agent, or Firm*—Posz Law Group, PLC (57) ABSTRACT

A transmissive or reflective diffractive optical element, comprising: a substrate having a top surface, the top surface being etched into a pattern, the pattern including a periodic surface pattern of grooves formed such that when an incoming light beam is shone onto the top surface, the incoming light beam will be split into a plurality of diffracted light beams, the plurality of diffracted light beams including a plurality of primary diffracted order beams and a plurality of secondary diffracted order beams, wherein the primary diffracted order beams have a primary aggregate efficiency above ninety percent, wherein the plurality of secondary diffracted order beams have a secondary aggregate efficiency of lower than ten percent, and wherein a maximum power of the primary diffracted order beams and a minimum power of the primary diffracted order beams differ by at least ten percent of an average power of the primary diffracted order beams.

25 Claims, 3 Drawing Sheets

OTHER PUBLICATIONS

Mait, Joseph N., "Design of binary-phase and multiphase Fourier gratings for array generation," J. Opt. Soc. Am. A, vol. 7, No. 8, Aug. 1990, pp. 1514-1528.

Leger, James R. et al., "Coherent laser addition using binary phase gratings," Applied Optics, vol. 26, No. 20, Oct. 15, 1987, pp. 4391-4399.

Prongue, D. et al., "Optimized kinoform structures for highly efficient fan-out elements," Applied Optics, vol. 31, No. 26, Sep. 10, 1992, pp. 5706-5711.

Hergenhan, Guido et al., "Coherent coupling of vertical-cavity surface-emitting laser arrays and efficient beam combining by diffractive optical elements: concept and experimental verification," Applied Optics, vol. 42, No. 9, Mar. 20, 2003, pp. 1667-1680.

Dammann H. et al., "High-Efficiency In-Line Multiple Imaging by Means of Multiple Phase Holograms," Optics Communications, vol. 3, No. 5, Jul. 1971, pp. 312-315.

Gerchberg, R.W. et al., "A Practical Algorithm for the Determination of Phase from Image and Diffraction Plane Pictures," Optik, vol. 35, No. 2, 1972, pp. 237-250.

Fan, T.Y. et al., "Coherent (phased array) and wavelength (spectral) beam combining compared," Fiber Lasers II: Technology, Systems and Applications, Proceedings of SPIE vol. 5709 (SPIE, Bellingham, WA, 2005), pp. 157-164.

* cited by examiner

DIFFRACTIVE OPTICAL ELEMENT AND METHOD OF DESIGNING THE SAME

FIELD OF THE INVENTION

The present invention relates generally to diffractive optical elements. More particularly, the present invention relates to a diffractive optical element configured to efficiently combine multiple input beams into a single output beam, and a method of making the same.

BACKGROUND

A diffractive optical element ("DOE") is a physical element that redirects selected wavelengths of light into specific positions that are defined by the physical properties of the element. Typically, these DOEs are used to split a single beam of light into multiple beams of light. Such conventional DOE splitters are often used in such applications as bar code scanners, compact discs, or a variety of laser scanning devices.

A DOE can be reflective or transmissive. A reflective DOE splitter receives one incoming light beam and reflects it onto multiple light beams. In contrast, a transmissive DOE receives one incoming light beam and allows it pass through the DOE to diffract it onto multiple light beams.

A DOE splitter will actually split the incoming beam into a large number of diffracted orders, with the higher reflected orders generally dropping off in power. But any given DOE splitter application will not use all of these reflected orders. Rather, a DOE splitter will be designed with a specific number of primary output beams. These primary output beams (i.e., primary diffracted orders) have their power levels controlled by the DOE design to be very similar, while the remaining output beams (i.e., the secondary diffracted orders) will have power levels kept as low as possible. However, because only a subset of the total diffracted orders are used as output beams (i.e., only the primary orders), DOEs have an inherent limit on their efficiency. Any power diffracted into the unused beams (i.e., the secondary diffracted orders) is lost, dropping the DOE's efficiency below 100%.

DOE splitter applications have fairly demanding requirements with respect to the uniformity of the power for the primary diffracted orders (i.e., the maximum allowable variation of the split beams). In other words, the DOE splitters are required to output a number of beams having power levels that are very similar to each other. Generally these applications allow less than a few percentage of peak-to-peak variation in the power of the diffracted beams.

One type of conventional DOE splitter is based on a simple binary design. In other words, such DOE splitters are based on patterns of steep walled grooves with a single etch depth. These binary DOE splitters typically have a relatively modest efficiency (e.g., in the range of 80%). Alternate DOE splitter designs have been suggested that use multi-level etch depths. But these also include steep walls for the etching patterns. And they can typically only raise efficiency up to about 90%.

Furthermore, the surface patterns used in these conventional DOE splitters are discontinuous etch profiles, which limit the ability to deposit additional layers on the DOE subsequent to surface etching. As a result, when reflective DOEs are used, the discontinuously etched shapes may degrade in performance in reflection because the thick high reflection coating (typically 5 µm or more thick) will not conform to the etched surface shape near discontinuities or regions of large slope. Similar issues arise for transmissive DOEs, on which non-reflective coatings may be applied.

It would therefore be desirable to provide a DOE that can achieve a higher efficiency and will allow for the deposition of additional layers after etching without degrading performance. Furthermore, it would also be desirable to provide a DOE that is suitable for combiner applications.

SUMMARY OF THE INVENTION

Accordingly, the present invention provides a DOE device and design method that is insensitive to the uniformity of its diffracted orders. This DOE has a very gradually sloped surface with a maximum slope of a few degrees. Because of the gradually sloped surface, the DOE can be coated with a low absorption coating that conforms to the etched shape and thus maintains high efficiency while enabling very high power operation.

A reflective diffractive optical element is provided, comprising: a light-reflective substrate having a top surface, the top surface being etched into a pattern, the pattern including a periodic surface pattern of grooves each having a period or width W, wherein the pattern has a continuous depth profile $h(x)$, x being a coordinate in a width direction that varies across the width W, wherein the pattern is formed such that when an incoming light beam having a wavelength $\lambda$ is shone onto the top surface of the light-reflective substrate, the incoming light beam will reflect and be split into a plurality of diffracted light beams, wherein the plurality of diffracted light beams includes a plurality of primary diffracted order beams and a plurality of secondary diffracted order beams, wherein the primary diffracted order beams have a primary aggregate efficiency above ninety percent, where the primary aggregate efficiency is the total power of the primary diffracted order beams divided by the incoming beam power, wherein the plurality of secondary diffracted order beams have a secondary aggregate efficiency of lower than ten percent, where the secondary aggregate efficiency is the total power of the secondary diffracted order beams divided by the incoming beam power, and wherein a maximum power of the primary diffracted order beams and a minimum power of the primary diffracted order beams differ by at least ten percent of an average power of the primary diffracted order beams.

The maximum power of the primary diffracted order beams and the minimum power of the primary diffracted order beams may differ by at least forty percent of the average power of the primary diffracted order beams In the reflective diffractive optical element, a combining efficiency $\eta$ for combining a plurality of incoming light beams of equal powers may be greater than the primary aggregate efficiency would be if the maximum power of the primary diffracted order beams and the minimum power of the primary diffracted order beams differed by less than ten percent of the average power of the primary diffracted order beams, wherein the combining efficiency $\eta$ is equal to $$\eta = \frac{\left(\sum_{1}^{N} \sqrt{P_i}\right)^2}{N \sum_{-\infty}^{\infty} P_i},$$

wherein $P_i$ is a power of an $i^{th}$ diffracted light beam, wherein i is an integer representing a diffracted order of the diffracted light beams, and wherein the diffracted orders 1, 2, . . . N correspond to the primary diffracted order beams.

The reflective diffractive optical element may further comprise: one or more reflective coating layers formed over the top surface of the light-reflective substrate, wherein the one or more reflective coatings are applied such that an exposed surface of the one or more reflective coatings maintains the pattern.

The profile may be one of a one-dimensional profile that varies periodically in depth along one direction, or a two-dimensional profile that varies periodically in depth along two directions. The grooves in the pattern may have a maximum slope of ten degrees anywhere along the top surface of the light-reflective substrate.

The reflective diffractive optical element may further comprise a cooling element attached to a bottom surface of the light-reflective substrate, the bottom surface being opposite the top surface.

A transmissive diffractive optical element is also provided, comprising: a light-permeable substrate having a top surface, the top surface being etched into a pattern, the pattern including a periodic surface pattern of grooves each having a width W, wherein the pattern has a continuous depth profile h(x), x being a coordinate in a width direction that varies from 0 to W, wherein the pattern is formed such that when an incoming light beam having a wavelength λ is shone onto the top surface of the light-permeable substrate, the incoming light beam will pass through the light-permeable substrate and be split into a plurality of diffracted light beams, wherein the plurality of diffracted light beams includes a plurality of primary diffracted order beams and a plurality of secondary diffracted order beams, wherein the primary diffracted order beams have a primary aggregate efficiency above ninety percent, where the primary aggregate efficiency is the total power of the primary diffracted order beams divided by the incoming beam power, wherein the plurality of secondary diffracted order beams have a secondary aggregate efficiency of lower than ten percent, where the secondary aggregate efficiency is the total power of the secondary diffracted order beams divided by the incoming beam power, and wherein a maximum power of the primary diffracted order beams and a minimum power of the primary diffracted order beams differ by at least ten percent of an average power of the primary diffracted order beams.

The maximum power of the primary diffracted order beams and the minimum power of the primary diffracted order beams may differ by at least forty percent of the average power of the primary diffracted order beams In the transmissive diffractive optical element, a combining efficiency 77 for combining a plurality of incoming light beams of equal powers may be greater than the primary aggregate efficiency would be if the maximum power of the primary diffracted order beams and the minimum power of the primary diffracted order beams differed by less than ten percent of the average power of the primary diffracted order beams, wherein the combining efficiency η is equal to $$\eta = \frac{\left(\sum_{1}^{N} \sqrt{P_i}\right)^2}{N \sum_{-\infty}^{\infty} P_i},$$

wherein $P_i$ is a power of an $i^{th}$ diffracted light beam, wherein i is an integer representing a diffracted order of the diffracted light beams, and wherein the diffracted orders 1, 2, . . . N correspond to the primary diffracted order beams.

The transmissive diffractive optical element may further comprise: one or more non-reflective coating layers formed over the top surface of the light-permeable substrate, wherein the one or more non-reflective coatings are applied such that an exposed surface of the one or more non-reflective coatings maintains the pattern.

The profile may be one of a one-dimensional profile that varies in depth along one direction, or a two-dimensional profile that varies in depth along two directions. The grooves in the pattern may have a maximum slope of ten degrees anywhere along the top surface of the light-permeable substrate.

A method of forming a diffractive optical element in a substrate for combining a plurality of incoming light beams into one outgoing beam is provided, comprising: selecting a current set of N phases for the plurality of incoming light beams, respectively, each beam being represented by a harmonic of a single complex exponential and a phase; determining a resultant complex sum field for the outgoing beam based on the current set of N phases, the outgoing beam comprising a sum of N harmonic complex exponentials; determining an average amplitude of the resultant complex sum field over a single period of the resultant complex sum field; determining whether an optimization criteria is met for the maximum of the average amplitude; determining an optimized continuous diffractive optical element phase retardance if the maximum criteria is met, where the optimized continuous diffractive optical element phase retardance is the phase in radians of the resultant optimized complex sum field over a given period; determining an etch depth profile over the single period based on a wavelength λ of the plurality of incoming light beams, the etch depth profile h(x) being equal to the product of the phase in radians and a constant of proportionality; determining a constant of proportionality for the diffractive optical element as a function of the wavelength λ; determining a width W of the etch profile based on the wavelength λ and an angular separation θ between the plurality of incoming light beams; and etching a top surface of a substrate with a periodic series of grooves to form a surface profile on the substrate, each groove being defined by the etch depth profile and the width W, wherein N is an integer corresponding to a number of the plurality of incoming light beams, wherein x is a coordinate in a width direction that varies from 0 to W, and wherein the surface profile is continuous.

The diffractive optical element may be a reflective diffractive optical element, wherein the constant of proportionality is $$\frac{\lambda}{4\pi}.$$

The diffractive optical element may be a transmissive diffractive optical element, wherein the constant of proportionality is $$\frac{\lambda}{2\pi(n-1)},$$

where n is the index of refraction of the substrate. The period may be approximately $$\frac{\lambda}{\theta},$$

where θ is measured in radians.

The method may further comprise: selecting a new set of N phases for the plurality of incoming light beams, respectively, if the maximum criteria is not met; and setting the current set of N phases to be equal to the new set of N phases.

The selecting of the new set of N phases may be performed using one of a simplex estimation operation, simulated thermal annealing, or a Gerchberg-Saxton operation.

The operations of determining a resultant sum field, determining an average amplitude, and determining whether a maximum criteria is met, may be repeated for multiple sets of N phases until the maximum criteria is met.

The method may further comprise: depositing one or more coatings over the top surface of the substrate, after etching the top surface of the substrate, wherein an exposed surface of the one or more coatings maintains the surface profile. The one or more coatings may be reflective coatings or anti-reflective coatings.

The surface profile may be one of a one-dimensional profile that varies in depth along one direction, and a two-dimensional profile that varies in depth along two directions. The grooves may have a maximum slope of ten degrees anywhere along the top surface of the light-reflective substrate.

The method may further comprise attaching a cooling element to a bottom surface of the substrate, the bottom surface being opposite the top surface.

BRIEF DESCRIPTION OF THE DRAWINGS

The accompanying figures, where like reference numerals refer to identical or functionally similar elements throughout the separate views and which together with the detailed description below, are incorporated in and form part of the specification, serve to further illustrate various embodiments and to explain various principles and advantages all in accordance with the present invention.

DETAILED DESCRIPTION OF DISCLOSED EMBODIMENTS

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Applicant refers below to the drawings in which like numbers reference like components, and in which a single reference number may be used to identify an exemplary one of multiple like components.

Diffractive Optical Elements

Although diffractive optical elements (DOEs) are often used as splitters (i.e., to split a single incoming beam into multiple output beams), they can also be used in reverse as combiners (i.e., to combine multiple input beams into a single output beam). In a beam combination application, multiple light beams are projected onto a DOE, which either reflects them (for a reflective DOE) or transmits them (for a transmissive DOE) into a single primary outgoing light beam. To combine efficiently the beams must be coherent with precisely selected relative phases. And because the operation of a DOE is mathematically symmetrical, it is well known in the art that a DOE splitter designed to have one input beam and N output beams, can also be used in reverse to coherently combine N precisely-phased input beams into one output beam (and vice versa).

Figure 1:
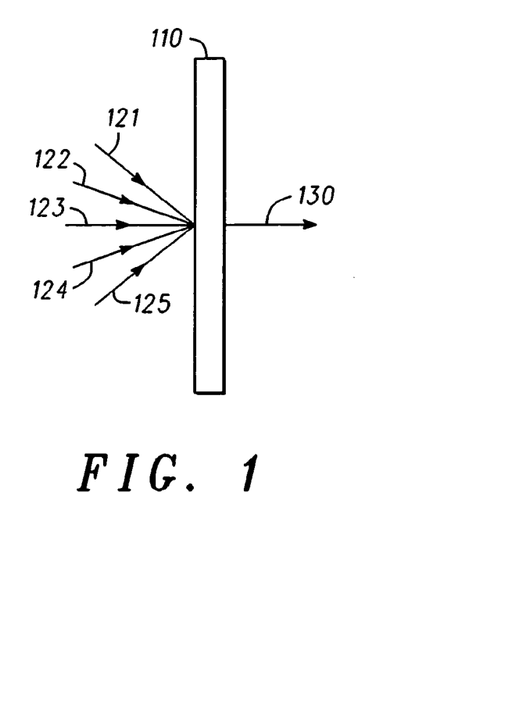
FIG. 1 is a diagram of the operation of a transmissive DOE combiner according to disclosed embodiments of the present invention.

FIG. 1 is a diagram of the operation of a transmissive DOE combiner 110 according to disclosed embodiments of the present invention. As shown in FIG. 1, a plurality of incoming light beams 121, 122, 123, 124, and 125 of a given wavelength $\lambda$ are overlapped onto a common point on the transmissive DOE combiner 110. These light beams 121, 122, 123, 124, and 125 pass through the transmissive DOE combiner 110, where they are diffracted such that they produce a single transmitted output light beam 130 with a majority of the input power. Although not shown, the transmissive DOE combiner 110 would have a number of secondary output light beams at very small power levels.

Figure 2:
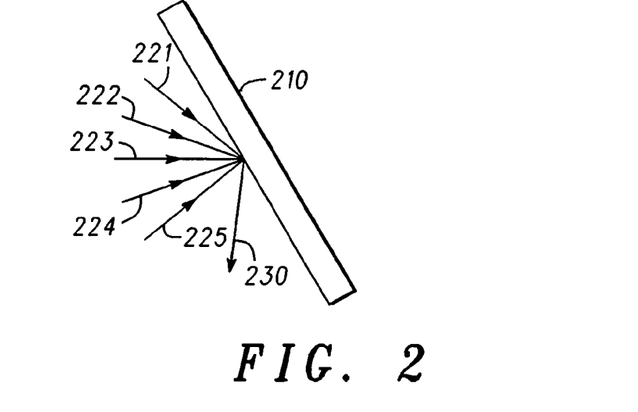
FIG. 2 is a diagram of the operation of a reflective DOE combiner, according to disclosed embodiments of the present invention.

FIG. 2 is a diagram of the operation of a reflective DOE combiner 210, according to disclosed embodiments of the present invention. As shown in FIG. 2, a plurality of incoming light beams 221, 222, 223, 224, and 225 of a given wavelength $\lambda$ are overlapped onto a common point on the reflective DOE combiner 210. These light beams 221, 222, 223, 224, and 225 are reflected off of the reflective DOE combiner 210, and are diffracted such that they produce a single reflected output light beam 230 with a majority of the input power. Although not shown, the reflective DOE combiner 210 would have a number of secondary output light beams at very small power levels.

As noted above, a DOE combiner works in a reverse manner as a DOE splitter. Just as the single input beam of a DOE splitter produces multiple diffracted orders (i.e., the primary and secondary diffracted orders), the multiple input beams in a DOE combiner each also produce multiple diffracted orders. But because of constructive and destructive interference between these multiple diffracted orders for all of the input beams, a majority of the output power for the DOE combiner is directed into a single output beam. However, there is still some power that is output from the DOE combiner in the form of unwanted diffracted orders. As a result, like a comparable DOE splitter, a DOE combiner will also have an efficiency below 100%. One skilled in the art would understand that it can be mathematically shown that the efficiency of a given DOE is the same whether it is used as a splitter or used in reverse as a combiner with precisely phased and reversed primary beams (i.e., where the relative powers of the combined beams have the same ratios as the primary beams generated by the DOE when used as a splitter).

Diffractive Optical Element Efficiency

A DOE splitter has a splitting efficiency $\eta_{splitting}$ based on the lost power from unused secondary diffractive orders. Consider, by way of example, a 1:N DOE splitter with a single input beam and N output beams (i.e., corresponding to the N primary diffracted orders). This DOE splitter will have an efficiency loss for its splitting operation based on whatever portion of the input beam is diffracted into unused secondary diffractive orders, and is therefore lost to the N desired output beams.

For purposes of analysis, consider that that input beam has a power $P_{in}$, and the N output beams each have powers and amplitudes $P_i$ and $E_i$, respectively (where $P_i = E_i^2$). The splitting efficiency $\eta_{splitting}$ is determined by the total power of the N primary diffracted orders $$\left(\text{i.e.}, \sum_1^N P_i\right)$$

divided by the total power of all of the primary and secondary diffracted orders $$\left(\text{i.e.}, \sum_1^\infty P_i\right).$$

In other words, $$\eta_{splitting} = \frac{\sum_1^N P_i}{\sum_1^\infty P_i} \tag{1}$$

where i is an index of all of the diffracted orders varying from 1 to ∞, with i=1 through i=N representing the primary orders. In this example, the positive indices 1 through N are used only for simplicity and are meant to include the conventional numbering of positive and negative diffractive orders 0, ±1, ±2, etc.

For the sake of simplicity, this analysis and the analysis below will ignore all non-diffractive losses $$\left(\text{i.e.}, \sum_1^\infty P_i = P_{in}\right),$$

and will normalize the average power per primary diffracted beam to $$1 \text{ (i.e., } \sum_1^N P_i = N, \text{ or } \langle P_i \rangle = \langle E_i^2 \rangle \equiv \sum_1^N P_i / N = 1,$$

where < . . . > connotes the mean value over the N primary orders).

Of course, because a DOE is symmetrical for splitting and combining, if the operation of the DOE splitter were exactly reversed, it could be operated with a combining efficiency $\eta_{combining}$ that is identical to the splitting efficiency $\eta_{splitting}$. But to do so, the DOE combiner would have to maintain precise phases and power ratios for its multiple input beams that was the same as the power ratios for the multiple output beams of the DOE splitter.

If, however, the input power ratios of a DOE combiner are not perfectly balanced to match the corresponding output power ratios for the DOE splitter, then the combining efficiency $\eta_{combining}$ will be further reduced based on a balance efficiency $\eta_{balance}$. In other words, $$\eta_{combining} = \eta_{splitting} \cdot \eta_{balance} \tag{2}$$

When the input power ratios of a DOE combiner are perfectly balanced to match the corresponding output power ratios for the DOE splitter (i.e., when the relative power of each input beam is the same as the relative power for a corresponding output beam of the DOE splitter), the balance efficiency $\eta_{balance}$ is equal to unity. And as the input powers of the DOE combiner move farther from the corresponding output powers for the DOE splitter, the balance efficiency $\eta_{balance}$ will decrease. However, the drop in balance efficiency $\eta_{balance}$ is actually quite modest, even for large power imbalances.

Consider, for example, an ideal 2:1 interferometric combiner (e.g., a half-silvered mirror that reflects and transmits 50% of the incident light) that takes two incoming beams and combines them into one outgoing beam. If the two inputs are perfectly phased and have equal power (50%/50%), it is possible to adjust the relative phases such that 100% of the combined input power is directed to the desired output port. However, if the input powers are unequal, even with perfect phasing, a fraction of the input power will be lost. Suppose the power imbalance is ±20% of the mean input, i.e. the inputs are 0.8× and 1.2× of the ideal power balanced values (and hence 40% and 60% of the total power, respectively). With proper phasing the two input amplitudes will destructively interfere in the undesired port and the lost power fraction will be equal to $$\frac{(\sqrt{1.2} - \sqrt{0.8})^2}{4} = 1\%$$

of the total power. In other words, this 2:1 combiner would be 99% efficient, even with ±20% input imbalance.

This can be generalized for an ideal N:1 interferometric combiner. If each of the N input beams has a power and amplitude of $P_i$ and $E_i$, respectively, where $P_i = E_i^2$, and the average power per beam is normalized to 1 (i.e., $\Sigma_1^N P_i / N = 1$), it is possible to show that the balance efficiency $\eta_{balance}$ of the interferometer for any given state of power balance is given by $$\eta_{balance} = \frac{\langle E_i \rangle^2}{\langle E_i^2 \rangle} = \langle E_i \rangle^2 = \left(\frac{\sum_1^N E_i}{N}\right)^2, \tag{3}$$

where < . . . . > connotes the mean value over the N input beams.

This expression can be intuitively understood simply as the properly normalized intensity corresponding to the sum of the ideally phased and coherent amplitudes combined by the splitter. The balance efficiency $\eta_{balance}$ can also be directly related to the root mean square (RMS) variation of the input amplitudes, i.e., $$E_{RMS} \equiv \sqrt{\frac{\sum_{1}^{N}(E_i - <E_i>)^2}{N}}. \tag{4}$$

It is then possible to find the loss in combining efficiency by determining $$1-\eta_{balance} = E = _{RMS}^2. \tag{5}$$

Since $P_i = E_i^2$, for a small amount of variation, the fractional RMS variation of the input powers is thus about twice that of the fractional RMS input amplitude variation. As a result, $$1 - \eta_{balance} \cong \frac{P_{RMS}^2}{4}. \tag{6}$$

It therefore becomes clear that a fairly large scatter of input powers leads only to a very modest reduction in efficiency. For example, if $P_{RMS} \sim 10\%$ of the average input power, then the loss in efficiency is only ~0.25%. Furthermore, if the input power variation follows a Gaussian distribution, the peak-to-peak variation in input powers will be several times larger than the RMS value (e.g., about 5× is typical). Thus, even a 50% peak-peak variation about the mean in the input powers of an N beam interferometer can lead to a loss in balance efficiency balance of only a fraction of a percent as compared to an equivalent system with a perfect power balance. This tolerance translates directly to a greatly relaxed uniformity requirement for diffracted orders of the 1:N DOE when it is used as a beam combiner, which in turn allows design of a DOE with a higher efficiency.

In other words, if the DOE is used as a combiner and all the incident beams are assumed to have equal power then $P_i$ in the above equations (2)-(6) can be considered the power fractions in the $i^{th}$ diffracted order of the DOE when used as a splitter. The combining efficiency $\eta_{combining}$ of a DOE with splitting power fractions $P_i = E_i^2$ and N incident beams of equal powers is given by $$\eta_{combining} = \eta_{splitting} \times \eta_{balance} \tag{7}$$

$$= \frac{\sum_{1}^{N} P_i}{\sum_{-\infty}^{\infty} P_i} \times \frac{\left(\sum_{1}^{N} E_i\right)^2}{N \sum_{1}^{N} P_i}$$

$$= \frac{\left(\sum_{1}^{N} E_i\right)^2}{N \sum_{-\infty}^{\infty} P_i}$$

Therefore, since a relaxed tolerance on the uniformity of the splitting power fractions allows a DOE with higher splitting efficiency $\eta_{splitting}$, and the balance efficiency $\eta_{balance}$ in equations (3)-(7) is very close to unity even for fairly large power fraction variation ($P_{RMS}$), an ideal DOE combiner with unequal splitting power fractions can have a higher efficiency than a splitter designed to have equal powers among the primary orders.

Diffractive Optical Elements Combiner with Unequal Input Powers

As noted above, in conventional DOE splitter designs, the power of the multiple output beams are all kept to within a few percentage points (peak-to-peak) of each other. This is because the devices that use these DOE splitters typically require output beams that have roughly the same power level. Similarly, devices that use DOE combiners also use multiple input beams that typically have roughly equal powers to generate a combined output beam.

If a DOE designed as a conventional splitter (i.e., one designed to have equal powers for the output beams) were used as a DOE combiner, it could be used with a balance efficiency $\eta_{balance}$ of unity (or close to unity). This is because the DOE splitter is balanced to have all of the output beams of equal power. Thus, when used as a DOE combiner with input beams of equal powers, the DOE combiner would be used in perfectly reversed balance.

But it is also possible to design a DOE combiner to have maximum efficiency with ideal input beams of unequal power. If such a DOE combiner were provided with input beams of equal power, then the DOE combiner would have a balance efficiency $\eta_{balance}$ less than unity. This is because the equal-power input beams of the DOE combiner would be out of balance with the required power ratios as required for this ideal DOE combiner design. However, as shown above, the loss in balance efficiency $\eta_{balance}$ due to imbalance among the input beam powers is relatively modest. In fact, the loss of balance efficiency $\eta_{balance}$ caused by allowing non-uniform powers among the primary diffractive orders of the DOE combiner is more than outweighed by the increase in splitting efficiency $\eta_{splitting}$ obtained by not constraining the DOE design to provide equal primary diffracted order powers.

It is therefore possible to directly determine an efficient design for an N:1 combiner by removing the constraint of uniform power for the diffracted orders. In fact, such a combiner can actually be designed with optimal efficiency as a combiner, rather than as a splitter that is then used as a combiner.

Consider N plane wave beams from a linear array incident upon a DOE. For any given phase relationship among these beams, it is possible to calculate the amplitude and phase of the resultant sum field at the plane of the DOE. Mathematically the resultant field can be represented as a finite 1D Fourier series $$E(x) = \sum_{m=-M}^{+M} \exp[i(mk_D x + \phi_m)], \tag{8}$$

where the sum represents a symmetric linear array of N=2M+1 input beams, $\phi_m$ are the individual beam phases and free parameters to be optimized, x is the coordinate along the periodic direction, and the k-vector of the DOE is $k_D = 2\pi/W$, where W is the groove width or period of the DOE. If the DOE design is chosen to be an exact conjugate of the resultant phase of the incoming sum of N beams (i.e. the total phase of E(x) from Equation (8)), then the combined beam after passing the DOE will have the phase canceled and thus have amplitude modulation but no net phase aberration. The residual amplitude modulation |E(x)| will then determine the combining efficiency $\eta_{combining}$. The combining efficiency $\eta_{combining}$ is the fraction of the total power of the resultant beam diffracted into the $0^{th}$ order, which can be found by applying Equations (3)-(6) above, where $E_i$ is replaced by

|E(x)| and the sums are replaced by integration over x. Thus, since E(x) is periodic over the DOE period W, the combining efficiency $\eta_{combining}$ can be calculated as $$\eta_{combining} = \frac{\langle |E(x)| \rangle^2}{\langle |E(x)|^2 \rangle} \qquad (9)$$

$$= 1 - \frac{|E(x)|_{RMS}^2}{\langle |E(x)|^2 \rangle}$$

$$\equiv 1 - \frac{\int_0^W (|E(x)| - \langle |E(x)| \rangle)^2 dx}{\int_0^W |E(x)|^2 dx}.$$

Therefore, it is clear from the above analysis that the maximum combining efficiency $\eta_{combining}$ is found by optimizing the phases of the N incoming beams such that the intensity variation of the resultant sum beam of Equation (8) (i.e. $|E(x)|_{RMS}$) is minimized, or equivalently maximizing $\langle |E(x)| \rangle$. Once the N incoming phases have been optimized, it is simply necessary to calculate the conjugate of the periodic phase $\phi(x)$ of the resultant field E(x) to find the ideal DOE design; i.e. E(x)=|E(x)|exp [i$\phi$(x)].

Thus, while conventional DOE splitters are optimized to achieve uniform distribution of the primary diffracted orders, this DOE combiner design has no such constraint. As a result, it may have a large variation among the primary diffracted order intensities.

A variety of optimization methods may be used to minimize $|E(x)|_{RMS}$ and thus find the best beam phases and DOE combiner design. For many applications, where the value of N is not too large, a simplex optimization method is adequate. This method uses an N-dimensional polygon (the simplex) that searches for the optimum phases and self-adjusts its size to accommodate changes in the local derivatives of the function to be optimized (i.e., $|E(x)|_{RMS}$) (See, for example, *Numerical Recipes* in C, by W. H. Press et al, 2$^{nd}$ Edition, Cambridge University Press, 1992, page 408 ff.)

For larger values of N, where the simplex method may require long calculation times to find good optimized solutions, it is possible to use other standard optimization methods such as simulated thermal annealing. In this method a fictitious temperature is associated with the optimization procedure, which determines a probability, based on an exponential Boltzman distribution, to accept or reject a potential test solution as the best result. The solutions are iterated and then the temperature is slowly reduced in order to achieve the best optimum over a large N-dimensional space. (See, for example, *Numerical Recipes* in C, by W. H. Press et al, 2$^{nd}$ Edition, Cambridge University Press, 1992, page 444 ff.)

Alternately, convolutions of smaller solutions (N=M$_1$×M$_2$) can be used as a starting point and can then be further optimized using one of these methods or the Gerchberg-Saxton method. The Gerchberg-Saxton method is an iterative algorithm through the use of a propagating function, such as the Fourier transform.

The Gerchberg-Saxton method starts with an initial set of beam phases and calculates the field distribution E(x). The amplitude |E(x)| is then set equal to a constant, but the previously calculated phase is maintained. The far-field diffracted beam phases are then iteratively calculated from the now-revised near-field by a Fourier Transform. The amplitudes of the diffracted orders are all set equal to a constant and spurious orders ignored, but the re-calculated beam phases retained, and the procedure is iterated to find an optimal set of beam phases and hence DOE design as above.

Furthermore, if N=2M+1 is odd (i.e., if an odd number of input beams are used), the ideal solutions (i.e., those with maximum efficiency) are symmetric. In other words, $\phi_m = \phi_{-m}$, which means that it is only necessary to determine $\phi_m$ for positive values of m (since $\phi_0$ is arbitrary). This can significantly reduce the required computation time.

This class of solutions generally offers efficiencies well above 90%. Furthermore, when an odd number of beams N are used, the optimized solutions generally do not exhibit points along the x-direction in which the field E(x) vanishes. As a result, this solution avoids phase jumps of $\pi$, which would require a discontinuous etching profile, thus allowing for a continuous etching profile. Designs with an even number of beams can also be optimized, but because of the tendency for cancellation at points in the near-field points the RMS is usually larger and the resulting efficiencies are typically lower.

The simplest example of an odd-number combiner is based upon three beams. In such a combiner, the ideal beam phases to minimize the resultant amplitude variation in Equation (6) are $\phi_{\pm 1} = \pi/2$ (with $\phi_0$ being arbitrarily set to 0). The phase required for the optimal DOE design is therefore equal to $\phi(x) = \tan^{-1}(2 \cos(k_D x))$. The combining efficiency $\eta_{combining}$ with this design for three beams of equal power is 93.8%.

The DOE is manufactured by etching a periodic surface pattern of "grooves" of width W and having a groove depth profile h(x). W and h(x) are determined based on the phase $\phi(x)$ and some of the basic properties of the DOE.

The groove width W is determined by dividing the wavelength of operation $\lambda$ by the desired angular separation $\theta$ (measured in radians) between adjacent beams, i.e. W=$\lambda/\theta$.

The groove depth profile h(x) (or etch depth profile) is determined by multiplying the phase profile $\phi(x)$ by a constant value that depends upon the type of DOE. For a reflective DOE, the phase is adjusted by the retardance associated with double-passing the etch depth. Thus, if the phase is $\phi(x)$, then the groove depth is $$h(x) = \frac{\lambda}{4\pi} \cdot \phi(x), \qquad (10)$$

where $\lambda$ is the wavelength of operation (i.e. a depth of $\lambda$ corresponds to $4\pi$ radians or 2 waves of phase retardation). For a transmissive DOE, the phase retardation depends on the differential index of refraction of the substrate n, thus if the DOE is in air (n$_{air}$=1), and the phase is $\phi(x)$, then the etch depth is $$h(x) = \frac{\lambda}{2\pi(n-1)} \cdot \phi(x). \qquad (11)$$

Figure 3:
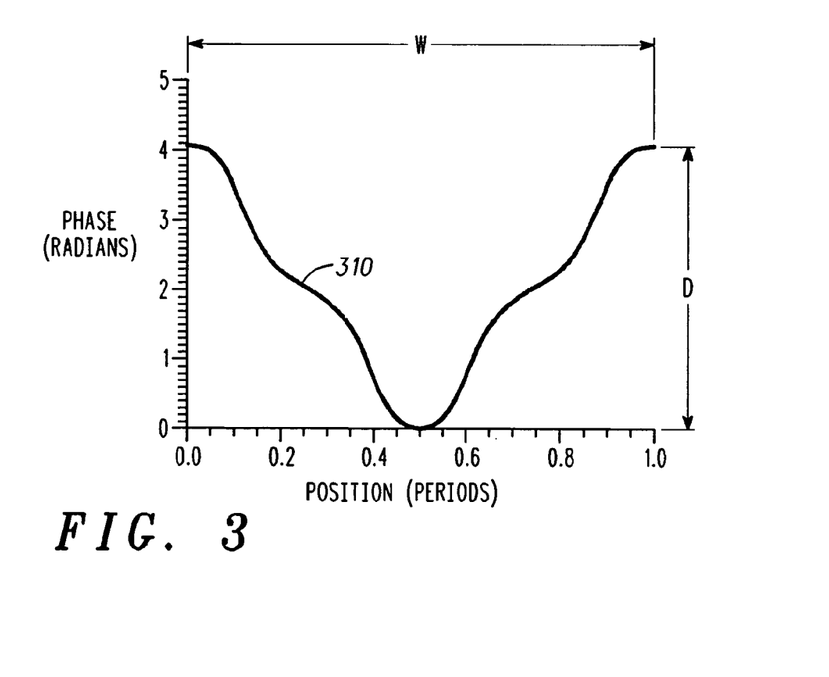
FIG. 3 is graph of a periodic phase variation and groove shape for a DOE combiner having five input beams, according to disclosed embodiments of the present invention.

FIG. 3 is graph 300 of a periodic phase variation and groove shape for a DOE combiner having five input beams, according to disclosed embodiments of the present invention. As shown in FIG. 3, the periodic phase over the period W is given by the equation $\phi(x)$, where x is an index that varies from 0 to 1 over the period W.

The optimal periodic phase is then determined based on the phase of the field in Equation (8). In this example, a rapid optimization (i.e., a minimizing of the amplitude variation in Equation (8) with M=2) using the simplex method was performed to determine that the optimal phase values are $\phi_{\pm 1} = \pi/2$ and $\phi_{\pm 2} = \pi$ radians (with $\phi_0$ being arbitrarily set to 0). In this example, the analytic form for the ideal phase was determined to be $\phi(x)=\tan^{-1}[2 \cos k_D x/(1-2 \cos 2 k_D x)]$, where $k_D=2\pi/W$, and W is the period of the DOE combiner.

Fabrication of such a DOE can then be implemented in any known manner, e.g., using a continuous gray scale etching technique. In addition, because the periodic phase (which is used to define the groove shape) does not have any discontinuities, a repetition of the grooves will provide a completely smooth surface profile.

Figure 4:
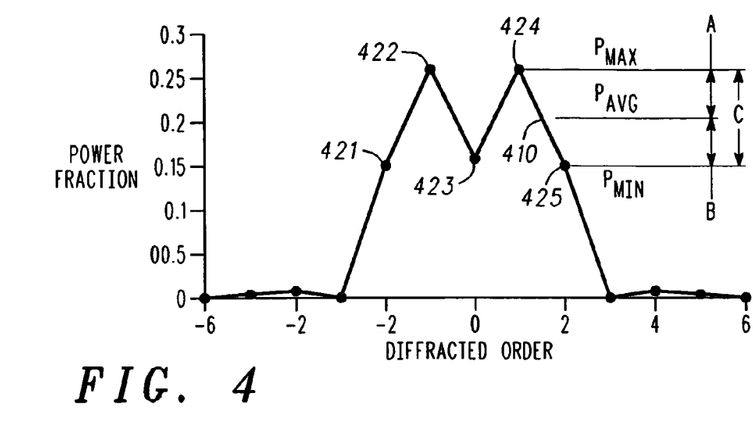
FIG. 4 is a graph of ideal power versus diffractive order for a 1:5 transmissive DOE, designed according to disclosed embodiments of the present invention

FIG. 4 is a graph 410 of ideal power versus diffractive order for a 1:5 transmissive DOE, designed according to disclosed embodiments of the present invention. As shown in FIG. 4, the DOE has $-2^{nd}$, $-1^{st}$, $0^{th}$, $1^{st}$, and $2^{nd}$ primary orders 421, 422, 423, 424, and 425. The diffracted fractions of the total power for these primary orders are 15.7%, 26.1%, and 15.1% in each of the $0^{th}$, $\pm1^{st}$, and $\pm2^{nd}$ orders, respectively. Thus, this DOE design has a fractional average power $P_{AVG}$ for the primary orders of 19.6%, a fractional minimum power $P_{MIN}$ for the primary orders of 15.1%, and a fractional maximum power $P_{MAX}$ for the primary orders of 26.1%. This DOE therefore has a difference A of 6.5% between $P_{MAX}$ and $P_{AVG}$, a difference B of 4.5% between $P_{AVG}$ and $P_{MIN}$, and a peak-to-peak difference gap C of 11% between $P_{MAX}$ and $P_{MIN}$. Expressed as a fraction of the average order power $P_{AVG}$, the peak-to-peak power variation is 11/19.6=56% of the average power.

The ideal splitting efficiency $\eta_{splitting}$ of a DOE splitter using this design is 97.9%. If five beams were combined using the DOE as a combiner, and the relative powers of the input beams were chosen to match these diffracted order ratios, then the balance efficiency $\eta_{balance}$ for this DOE combiner would be unity, and by equation (2), the combining efficiency $\eta_{combining}$ for these input power ratios would also be 97.9%.

However if this DOE were used as a combiner with five input beams of roughly equal power, the balance efficiency $\eta_{balance}$ would be lower than unity, as set forth in Equations (3)-(6). In particular, the balance efficiency $\eta_{balance}$ for this situation would be about 98.3% (i.e., $1-\eta_{balance} \sim 1.7\%$). Thus, despite the efficiency loss due to large imbalanced power fractions, the resulting combining efficiency $\eta_{combining}$ will be approximately 96.2%, which is significantly higher than the combination efficiency $\eta_{combining}$ of a DOE splitter designed to have equal primary power fractions.

In contrast, a DOE designed as a 1:5 splitter with equal primary power fractions can only achieve a splitting efficiency $\eta_{splitting}$ of about 92%. Thus, even if such a DOE were used as a combiner with perfectly balanced input powers (i.e., $\eta_{balance}=1$), the combining efficiency $\eta_{combining}$ could not be greater than the splitting efficiency of about 92%.

Therefore, although the disclosed DOE combiner incurs an additional efficiency loss $\eta_{balance}$ owing to the large non-uniformity of orders, the net combining efficiency $\eta_{combining}$ is still higher than can be achieved using conventionally designed DOEs with nearly equal diffracted order powers.

Table 1 provides information regarding the combining efficiencies $\eta_{combining}$ and peak-to-peak variation of splitting power fractions found for a number of odd-input DOE combiners with the disclosed method, assuming combination of input beams of equal powers. These numbers are for DOE designs obtained using the above process. In obtaining this data, simplex optimization was used for the beam counts up to 49. For the 81 beam case, an initial estimate was made for a convolution of two 9 beam designs (i.e., if the 9 beam phase is $\phi_9(x/P)$ periodic over the range $0 \leq x \leq P$, then the design starting point is taken to be $\phi_{81}(x/P)=\phi_9(9 \times/P)+\phi_9(x/P)$. Starting with this initial guess, the Gerchberg-Saxton method rapidly converges to a 99.2% efficient solution.

TABLE 1

Disclosed DOE Combiner Properties

| Input Beam Count (N) | Combining Efficiency ($\eta_{combining}$) | Peak-to-Peak Variation/ Average of Order Powers when used as a Splitter (%) |
|---|---|---|
| 3 | 93.8 | 46 |
| 5 | 96.3 | 56 |
| 7 | 97.5 | 41 |
| 9 | 99.3 | 11 |
| 11 | 98.4 | 44 |
| 13 | 98.6 | 56 |
| 15 | 98.2 | 52 |
| 17 | 98.7 | 26 |
| 19 | 98.3 | 50 |
| 21 | 99.0 | 35 |
| 25 | 99.0 | 44 |
| 49 | 99.2 | 37 |
| 81 | 99.2 | 33 |

As shown in Table 1, the combining efficiencies $\eta_{combining}$ for these DOE combiner designs are relatively high as compared to DOEs designed as splitters with uniform primary order powers. This is despite the fact that the peak-to-peak variations of the diffracted order powers are relatively high.

Diffractive Optical Element Combiners

As shown above, FIG. 3 is graph 300 of a periodic phase variation and groove shape for a DOE combiner having five input beams, according to disclosed embodiments of the present invention. Considering this graph 300 as a groove shape, the groove has a set width W and a depth profile h(x) 310 that varies from 0 to D. The width W represents the period of the periodic series of grooves on the DOE 110 or 120.

In order to make the DOE combiner, the groove defined by W and $\phi(x)$ is periodically repeated on the top surface of the substrate that makes up the DOE. In addition, although the disclosed embodiments show a groove that is periodic in one-dimensional (i.e., along the x-axis), one skilled in the art would understand that the above analysis could easily be extended to apply to a surface pattern periodic in two-dimensions (i.e., along the x- and orthogonal y-axes).

Figure 5:
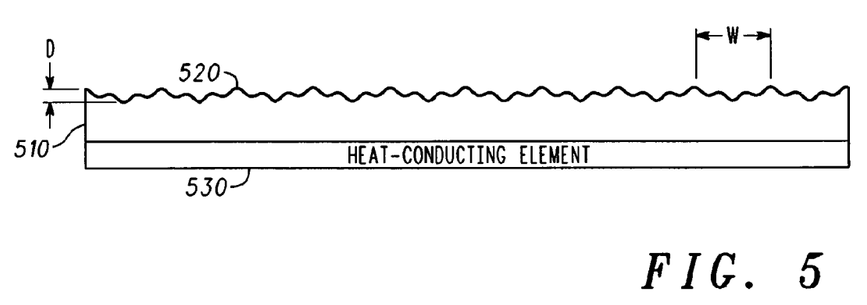
FIG. 5 is a diagram of a cut-away portion of a DOE combiner having five input beams, using the grooves of FIG. 3, according to disclosed embodiments of the present invention.

FIG. 5 is a diagram of a cut-away portion of a DOE combiner having five input beams, using the grooves of FIG. 3, according to disclosed embodiments of the present invention. As shown in FIG. 5, the DOE 500 has the groove 300 repeated multiple times on a top surface of a substrate 510 to form a pattern 520.

In addition, the disclosed embodiments of FIG. 5 include a heat-conducting element 530 attached to the back of the substrate 510. For example, the heat-conducting element 530 could be a metal plate that is attached to the DOE substrate 510 with a thermally conductive adhesive. This heat-conducting element conducts heat away from the substrate, thus greatly reducing the potential effects of thermally-induced deformation in the DOE. Of course, this can only be done when the DOE is a reflective DOE, since a transmissive DOE must have both sides of the substrate unoccluded.

Alternate embodiments can also have either a reflective coating or a non-reflective coating applied over the substrate. A reflective DOE can have one or more reflective coatings applied over the top surface of the substrate to improve the efficiency of the reflection; similarly, a transmissive DOE can have one or more non-reflective coatings applied over the top surface of the substrate to reduce losses from light reflection. In either case, by maintaining a base pattern on the top surface of the substrate that is continuous and that has a relatively small angular change (e.g., no greater than about ten degrees slope at any point on the surface), the reflective or non-reflective coatings will conform and maintain the same pattern, allowing the coated DOE to diffract light in the same manner as the uncoated DOE.

Figure 6:
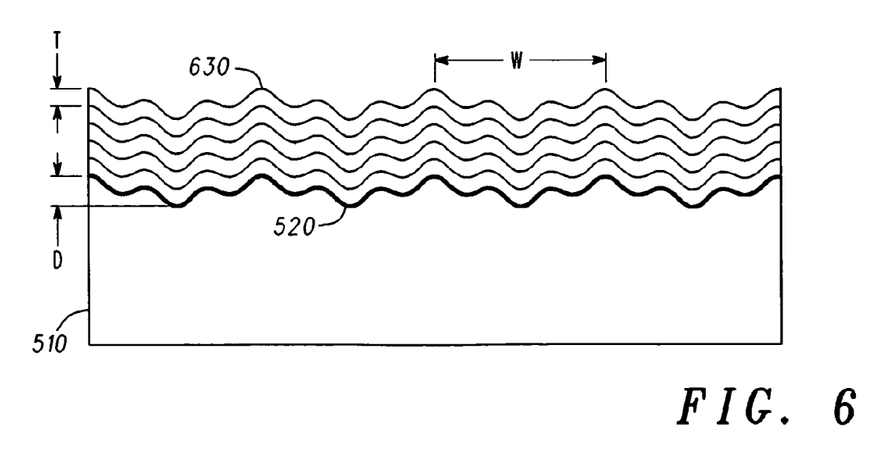
FIG. 6 is a diagram of a cut-away portion of a DOE combiner having five input beams, using the grooves of FIG. 3, with several coating layers deposited on it, according to disclosed embodiments of the present invention.

FIG. 6 is a diagram of a cut-away portion of a DOE combiner having five input beams, using the grooves of FIG. 3, with several coating layers deposited on it, according to disclosed embodiments of the present invention. As shown in FIG. 6, the substrate 510 has a pattern 520 form on a top surface. A plurality of coatings 630 are then formed over the top surface of the substrate, with a thickness T, such that a top surface of the topmost coating 640 maintains the same pattern 520 as the top surface of the substrate.

By using a smoothly-etched pattern 520 on the top surface of the substrate 410, which has a maximum slope of only a few degrees, the resulting DOE can be provided with a reflective or non-reflective coating with low loss and scatter, subsequent to surface etching. This can enable scaling of the DOE to very high incident powers.

Diffractive Optical Element Design

Figure 7:
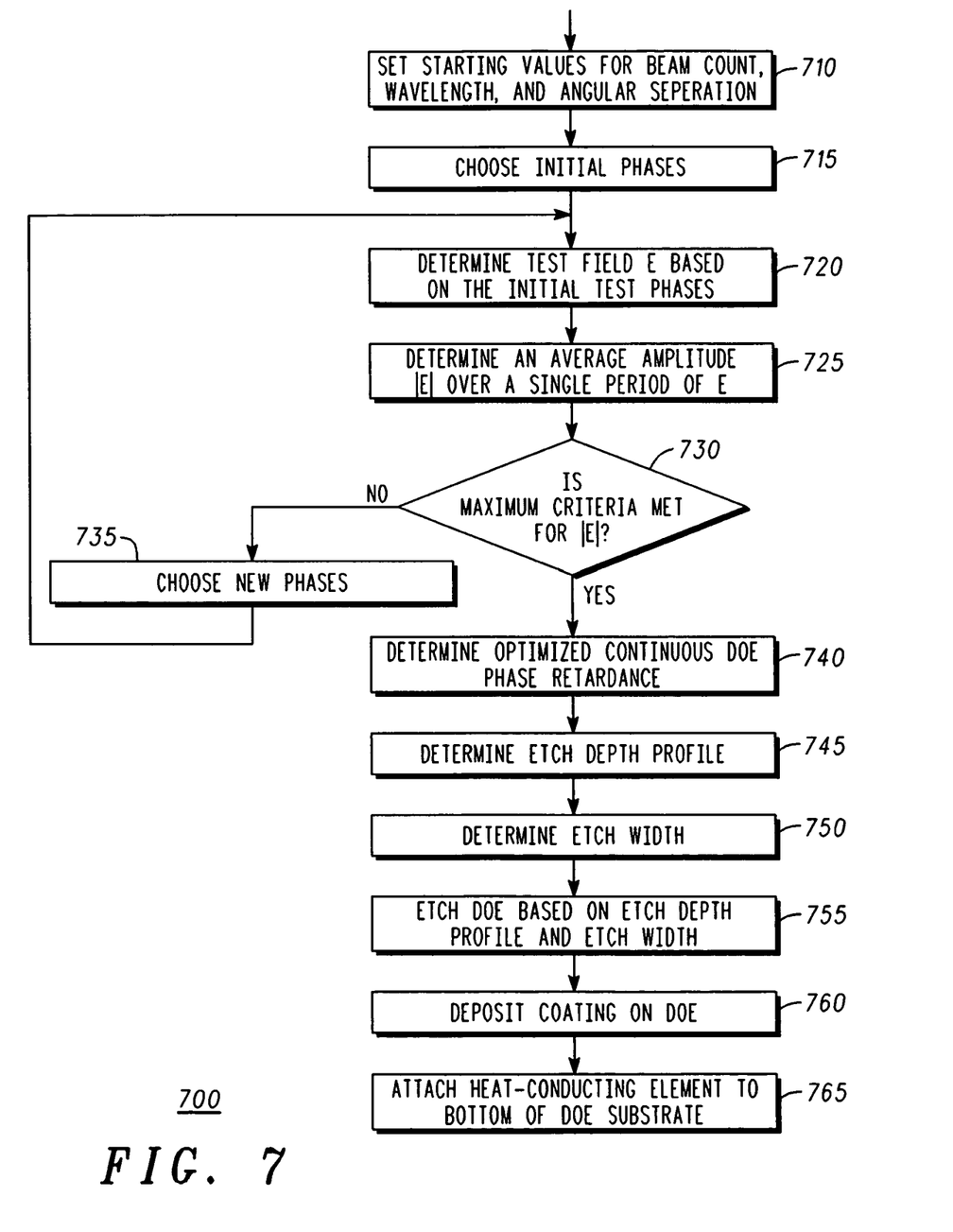
FIG. 7 is a flow chart of a process for etching the surface of a DOE according to disclosed embodiments of the present invention.

FIG. 7 is a flow chart of a process for etching the surface of a DOE according to disclosed embodiments of the present invention. As shown in FIG. 7, the process begins by setting the starting values for the beam count N of the combiner, the wavelength $\lambda$ of the beams that will be used, and the angular separation $\theta$ between adjacent beams (710). These starting parameters effectively define the general operation of the DOE, i.e., how many input beams there will be and how they will be arranged.

The process continues with choosing an arbitrary initial set of N test phases $\phi_i$, where i=1, 2, ... N (715). The method by which these phases can be chosen can vary. They could be randomly chosen or chosen based in some predictive manner known to one of skill in the art (e.g., based on symmetry or other considerations that is considered to yield an initial test solution with nearly optimal performance, such as the 81 beam case considered above.)

Next, it's necessary to determine a test field E(x) based on these initial test phases (720) as defined in equation (8), and then determine an average amplitude $\langle|E(x)|\rangle$ over a single period of E(x) (i.e., $0 \leq x \leq W$) (725).

Once the average amplitude $\langle|E(x)|\rangle$ is determined, it's necessary to determine whether the criteria for maximization of $\langle|E(x)|\rangle$ has been met (730). As noted above, this can be accomplished using a standard optimization procedure such as a simplex optimization procedure, simulated thermal annealing, or Gerchberg-Saxton methods.

If the maximization criteria for $\langle|E(x)|\rangle$ is not met, then it is necessary to choose, according to the selected optimization procedure, a new set of N test phases $\phi_i$, where i=1, 2, ... N (735) and once more determine the test field E(x) (720), the average amplitude $\langle|E(x)|\rangle$ (725), and whether the maximization criteria are met (730).

If the maximization criteria for $\langle|E(x)|\rangle$ is met, however, then it is necessary to determine an optimized continuous DOE phase retardance based on E(x) (740). This determination can be performed, for example, using the equation $$\phi_{opt}(x) = \tan^{-1}\left[\frac{\text{Im}(E(x))}{\text{Re}(E(x))}\right] \mod 2\pi \quad (12)$$

Once the continuous phase retardance profile $\phi_{opt}(x)$ is determined, it is necessary to determine the etch width W of the grooves (745) and an etch depth profile h(x) of the grooves (750). The etch width W is determined by dividing the wavelength $\lambda$ by the angular separation $\theta$ measured in radians (i.e., $W=\lambda/\theta$); and the etch depth profile h(x) is determined by multiplying the phase retardance profile $\phi_{opt}(x)$ measured in radians by a constant that depends upon the type of DOE (transmissive or reflective). For a reflective DOE, the etch depth profile h(x) is equal to the phase retardance profile $\phi_{opt}(x)$ multiplied by $$\frac{\lambda}{4\pi};$$

for a transmissive DOE, the etch depth profile h(x) is equal to the phrase retardance profile $\phi_{opt}(x)$ multiplied by $$\frac{\lambda}{2\pi(n-1)},$$

where n is the index of refraction of the DOE substrate.

Finally, the DOE substrate can be etched based on the etch width W and the etch depth profile h(x) (755). This can be performed using any acceptable etching method, as would be understood by one of skill in the art.

If desirable, one or more coatings can then be deposited on the DOE over the etched surface (760). These one or more coatings can be reflective or non-reflective.

In addition, if the DOE is a reflective DOE, a cooling element can be attached to a bottom surface of the DOE substrate opposite the etched surface. (765) This operation should be omitted for a transmissive DOE.

In alternate embodiments, however, the deposition of coatings (760) and the attachment of a cooling element (765) can be omitted.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to able one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A reflective diffractive optical element, comprising:
a light-reflective substrate having a top surface, the top surface being etched into a pattern, the pattern including a periodic surface pattern of grooves each having a width W,
wherein the pattern has a continuous depth profile h(x), x being a coordinate in a width direction that varies across the width W,
wherein the pattern is formed such that when an incoming light beam having a wavelength $\lambda$ is shone onto the top surface of the light-reflective substrate, the incoming light beam will reflect and be split into a plurality of diffracted light beams, wherein the plurality of diffracted light beams includes a plurality of primary diffracted order beams and a plurality of secondary diffracted order beams, wherein the primary diffracted order beams have a primary aggregate efficiency above ninety percent, where the primary aggregate efficiency is the total power of the primary diffracted order beams divided by the incoming beam power, wherein the plurality of secondary diffracted order beams have a secondary aggregate efficiency of lower than ten percent, where the secondary aggregate efficiency is the total power of the secondary diffracted order beams divided by the incoming beam power, and wherein a maximum power of the primary diffracted order beams and a minimum power of the primary diffracted order beams differ by at least ten percent of an average power of the primary diffracted order beams.

2. The reflective diffractive optical element of claim 1, wherein the maximum power of the primary diffracted order beams and the minimum power of the primary diffracted order beams differ by at least forty percent of the average power of the primary diffracted order beams.

3. The reflective diffractive optical element of claim 1, wherein a combining efficiency η for combining a plurality of incoming light beams of equal input powers is greater than the primary aggregate efficiency would be if the maximum power of the primary diffracted order beams and the minimum power of the primary diffracted order beams differed by less than ten percent of the average power of the primary diffracted order beams, wherein the combining efficiency η is equal to $$\eta = \frac{\left(\sum_{1}^{N} \sqrt{P_i}\right)^2}{N \sum_{-\infty}^{\infty} P_i},$$

wherein $P_i$ is a power of an $i^{th}$ diffracted light beam, wherein i is an integer representing a diffracted order of the diffracted light beams, and wherein the diffracted orders 1, 2, . . . N correspond to the primary diffracted order beams.

4. The reflective diffractive optical element of claim 1, further comprising:

one or more reflective coating layers formed over the top surface of the light-reflective substrate, wherein the one or more reflective coatings are applied such that an exposed surface of the one or more reflective coatings maintains the pattern.

5. The reflective diffractive optical element of claim 1, wherein the profile is one of a one-dimensional profile that varies in depth along one direction, or a two-dimensional profile that varies in depth along two directions.

6. The reflective diffractive optical element of claim 1, wherein the grooves in the pattern have a maximum slope of ten degrees anywhere along the top surface of the light-reflective substrate.

7. The reflective diffractive optical element of claim 1, further comprising a cooling element attached to a bottom surface of the light-reflective substrate, the bottom surface being opposite the top surface.

8. A transmissive diffractive optical element, comprising:

a light-permeable substrate having a top surface, the top surface being etched into a pattern, the pattern including a periodic surface pattern of grooves each having a width W, wherein the pattern has a continuous depth profile h(x), x being a coordinate in a width direction that varies from 0 to W, wherein the pattern is formed such that when an incoming light beam having a wavelength λ is shone onto the top surface of the light-permeable substrate, the incoming light beam will pass through the light-permeable substrate and be split into a plurality of diffracted light beams, wherein the plurality of diffracted light beams includes a plurality of primary diffracted order beams and a plurality of secondary diffracted order beams, wherein the primary diffracted order beams have a primary aggregate efficiency above ninety percent, where the primary aggregate efficiency is the total power of the primary diffracted order beams divided by the incoming beam power, wherein the plurality of secondary diffracted order beams have a secondary aggregate efficiency of lower than ten percent, where the secondary aggregate efficiency is the total power of the secondary diffracted order beams divided by the incoming beam power, and wherein a maximum power of the primary diffracted order beams and a minimum power of the primary diffracted order beams differ by at least ten percent of an average power of the primary diffracted order beams.

9. The transmissive diffractive optical element of claim 8, wherein the maximum power of the primary diffracted order beams and the minimum power of the primary diffracted order beams differ by at least forty percent of the average power of the primary diffracted order beams.

10. The transmissive diffractive optical element of claim 8, wherein a combining efficiency η for combining a plurality of incoming light beams of equal input powers is greater than the primary aggregate efficiency would be if the maximum power of the primary diffracted order beams and the minimum power of the primary diffracted order beams differed by less than ten percent of the average power of the primary diffracted order beams, wherein the combining efficiency η is equal to $$\eta = \frac{\left(\sum_{1}^{N} \sqrt{P_i}\right)^2}{N \sum_{-\infty}^{\infty} P_i},$$

wherein $P_i$ is a power of an $i^{th}$ diffracted light beam, wherein i is an integer representing a diffracted order of the diffracted light beams, and wherein the diffracted orders 1, 2, . . . N correspond to the primary diffracted order beams.

11. The transmissive diffractive optical element of claim 8, further comprising:

one or more non-reflective coating layers formed over the top surface of the light-permeable substrate, wherein the one or more non-reflective coatings are applied such that an exposed surface of the one or more non-reflective coatings maintains the pattern.

12. The transmissive diffractive optical element of claim 8, wherein the profile is one of a one-dimensional profile that varies in depth along one direction, or a two-dimensional profile that varies in depth along two directions.

13. The transmissive diffractive optical element of claim 8, wherein the grooves in the pattern have a maximum slope of ten degrees anywhere along the top surface of the light-permeable substrate.

14. A method of forming a diffractive optical element in a substrate for combining a plurality of incoming light beams into one outgoing beam, comprising:
  selecting a current set of N phases for the plurality of incoming light beams, respectively, each beam being represented by a harmonic of a single complex exponential and a phase;
  determining a resultant complex sum field for the outgoing beam based on the current set of N phases, the outgoing beam comprising a sum of N harmonic complex exponentials;
  determining an average amplitude of the resultant complex sum field over a single period of the resultant complex sum field;
  determining whether an optimization criteria is met for the maximum of the average amplitude;
  determining an optimized continuous diffractive optical element phase retardance if the maximum criteria is met, where the optimized continuous diffractive optical element phase retardance is the phase in radians of the resultant optimized complex sum field over a given period;
  determining an etch depth profile over the single period based on a wavelength $\lambda$ of the plurality of incoming light beams, the etch depth profile h(x) being equal to the product of the phase in radians and a constant of proportionality;
  determining a constant of proportionality for the diffractive optical element as a function of the wavelength $\lambda$;
  determining a width W of the etch profile based on the wavelength $\lambda$ and an angular separation $\theta 0$ between the plurality of incoming light beams; and
  etching a top surface of a substrate with a periodic series of grooves to form a surface profile on the substrate, each groove being defined by the etch depth profile and the width W,
  wherein N is an integer corresponding to a number of the plurality of incoming light beams,
  wherein x is a coordinate in a width direction that varies from 0 to W, and
  wherein the surface profile is continuous.

15. The method of claim 14,
  wherein the diffractive optical element is a reflective diffractive optical element, and
  wherein the constant of proportionality is $$\frac{\lambda}{4\pi}.$$

16. The method of claim 14,
  wherein the diffractive optical element is a transmissive diffractive optical element, and
  wherein the constant of proportionality is $$\frac{\lambda}{2\pi(n-1)},$$

where n is the index of refraction of the substrate.

17. The method of claim 14, wherein the period is approximately $$\frac{\lambda}{\theta},$$

where $\theta$ is measured in radians.

18. The method of claim 14, further comprising:
  selecting a new set of N phases for the plurality of incoming light beams, respectively, if the maximum criteria is not met; and
  setting the current set of N phases to be equal to the new set of N phases.

19. The method of claim 18, wherein the selecting of the new set of N phases is performed using one of a simplex estimation operation, simulated thermal annealing, or a Gerchberg-Saxton operation.

20. The method of claim 14, wherein the operations of determining a resultant sum field, determining an average amplitude, and determining whether a maximum criteria is met, are repeated for multiple sets of N phases until the maximum criteria is met.

21. The method of claim 14, further comprising:
  depositing one or more coatings over the top surface of the substrate, after etching the top surface of the substrate,
  wherein an exposed surface of the one or more coatings maintains the surface profile.

22. The method of claim 21, wherein the one or more coatings are one of a reflective coating or a non-reflective coating.

23. The method of claim 14, wherein the surface profile is one of a one-dimensional profile that varies periodically in depth along one direction, or a two-dimensional profile that varies periodically in depth along two directions.

24. The method of claim 14, wherein the grooves have a maximum slope of ten degrees anywhere along the top surface of the light-reflective substrate.

25. The method of claim 14, further comprising attaching a cooling element to a bottom surface of the substrate, the bottom surface being opposite the top surface.

* * * * *